United States Patent
Shibata et al.

(10) Patent No.: US 9,233,719 B2
(45) Date of Patent: Jan. 12, 2016

(54) VEHICLE BODY FRONT STRUCTURE FOR AUTOMOBILE

(71) Applicant: HONDA MOTOR CO., LTD., Minato-Ku, Tokyo (JP)

(72) Inventors: Yasuyuki Shibata, Saitama (JP); Hirotomo Yamada, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/653,979

(22) PCT Filed: Sep. 12, 2013

(86) PCT No.: PCT/JP2013/005431
§ 371 (c)(1),
(2) Date: Jun. 19, 2015

(87) PCT Pub. No.: WO2014/097515
PCT Pub. Date: Jun. 26, 2014

(65) Prior Publication Data
US 2015/0314811 A1    Nov. 5, 2015

(30) Foreign Application Priority Data

Dec. 21, 2012 (JP) ................. 2012-278920

(51) Int. Cl.
*B62D 25/08* (2006.01)
*B62D 29/00* (2006.01)
*B62D 27/02* (2006.01)

(52) U.S. Cl.
CPC ............. *B62D 25/088* (2013.01); *B62D 27/02* (2013.01); *B62D 29/008* (2013.01)

(58) Field of Classification Search
CPC ..... B62D 25/088; B62D 27/02; B62D 29/008
USPC ........................................ 296/193.09, 203.03
See application file for complete search history.

(56) References Cited

U.S. PATENT DOCUMENTS

| 8,757,705 | B2 * | 6/2014 | Yamagishi | B62D 25/088 180/90 |
| 8,789,875 | B2 * | 7/2014 | Kageyama | B62D 21/10 29/897.2 |
| 8,857,902 | B2 * | 10/2014 | Sekiguchi | B62D 25/082 296/187.09 |
| 8,939,496 | B2 * | 1/2015 | Obayashi | B62D 21/152 296/187.08 |

(Continued)

FOREIGN PATENT DOCUMENTS

JP    S63-171286 U    11/1988
JP    H02-189287 A    7/1990

(Continued)

*Primary Examiner* — Pinel Romain
(74) *Attorney, Agent, or Firm* — Carrier Blackman & Associates, P.C.; Joseph P. Carrier; William D. Blackman

(57) ABSTRACT

In a vehicle front structure, without increasing the thickness of the material of a damper housing structure and reinforcement portions, an adequate mechanical strength in supporting the damper can be ensured, and the cost of the manufacturing facilities can be minimized. The damper housing structure is formed by a damper base, a damper housing main body, a front reinforcement portion and a rear reinforcement portion, and the damper base. Each of the damper housing main body, the front reinforcement portion and the rear reinforcement portion includes a closed cross section portion extending linearly with a same cross section.

9 Claims, 9 Drawing Sheets

(56) References Cited

U.S. PATENT DOCUMENTS 9,079,617 B1 * 7/2015 Lueschen .............. B62D 27/023
9,126,633 B2 * 9/2015 Cho ....................... B62D 25/08

FOREIGN PATENT DOCUMENTS

| JP | H08-133124 A | 5/1996 |
| JP | 3997996 B2 | 10/2007 |

* cited by examiner

VEHICLE BODY FRONT STRUCTURE FOR AUTOMOBILE

TECHNICAL FIELD

The present invention relates to a vehicle body front structure for an automobile, and in particular to a vehicle body front structure including a damper housing structure having a damper for a front wheel suspension system mounted thereon.

BACKGROUND ART

A known vehicle body front structure comprises a pair of front side frames extending in the fore and aft direction on either side, a pair of front upper members extending in the fore and aft direction above the corresponding front side frames, respectively, on either side, and a pair of damper housing structures each connecting the corresponding front side frame to the associated front upper member.

In a conventional damper housing structure for such a vehicle body front structure, it is known to integrally form a damper housing (strut housing) including a damper base for retaining the upper end of a damper and reinforcement portions provided in the front and rear parts of the damper housing by stamp forming (See Patent Document 1, for instance).

PRIOR ART DOCUMENT(S)

Patent Document(s)

[Patent Document 1] JP3997996B

SUMMARY OF THE INVENTION

Task to be Accomplished by the Invention

In the case of a damper housing structure having a damper housing and reinforcement portions stamp formed in an integral manner, each reinforcement portion is provided with an open cross section (a channel configuration) due to the necessities associated with the stamp forming process, and may not be able to provide an adequate stiffness because a closed cross section cannot be achieved by itself.

In such a damper housing structure, in order to ensure an adequate stiffness in supporting the damper, it is necessary to use a relatively thick sheet stock for the damper housing and the reinforcement portions. However, the increase in the thickness of the sheet stock for the damper housing and the reinforcement portions increases the weight of the damper housing structure, and this in turn increases the pressure that has to be applied by the press forming machine used for fabricating the damper housing structure. An increase in the pressure of the press forming machine requires a more expensive stamp forming machine and/or a more expensive stamp forming die so that the cost of the manufacturing facilities increases.

A primary object of the present invention is to ensure an adequate mechanical strength in supporting the damper without increasing the thickness of the material for the damper housing and the reinforcement portions.

Means to Accomplish the Task

The present invention thus provides a vehicle body front structure, comprising: a pair of front side frames (10) extending in the fore and aft direction on either side; a pair of front upper members (12) extending in the fore and aft direction on either side above the corresponding front side frames (10), respectively; and a pair of damper housing structures (50) provided on either side to connect the front side frame (10) and the front upper member (12) to each other on either side; each damper housing structure (50) comprising a damper base (52) joined to the front upper member (12), a damper housing main body (58) extending linearly with a same closed cross section over an entire length thereof, and having a lower end joined to the front side frame (10) and an upper end joined to the damper base (52), and a reinforcement portion (60, 70) provided on each of a front part and a rear part of the damper housing main body (58), extending linearly with a same closed cross section over an entire length thereof, and having a lower end joined to the front side frame (10), an upper end joined to the front upper member (12) and a vertically extending side edge joined to the damper housing main body.

According to this arrangement, because the damper housing main body (58) is provided with a closed cross section, and the reinforcement portions (60, 70) are also each provided with a closed cross section, a high reinforcing effect can be achieved. Thereby, an adequate mechanical strength of the damper housing structure (50) in supporting the damper can be ensured without requiring the thickness of the material for the damper housing main body (58) and the reinforcement portions (60, 70) to be increased. Therefore, the weight of the damper housing structure (50) is not required to be increased. Furthermore, the need for a high pressure loading for the stamp forming process can be avoided so that the need for an expensive stamp forming machine and/or an expensive stamp forming die can be eliminated, and the cost of the manufacturing facilities can be minimized.

In this invention, it may also be arranged such that the damper housing main body (58) is provided with a closed cross section having an arcuate outboard wall (58A) with a concave surface.

According to this arrangement, the cylindrical damper can be positioned inside the damper housing main body (58) without wasting space so that the structure associated with the damper can be formed in a compact manner.

In this invention, it may also be arranged such that the front upper member (12) is located outboard of the front side frame (10); the damper base has (52) an end that is bonded to the front upper member (12) and extends inboard beyond the front upper member (12); the damper housing main body (58) extends vertically from the front side frame (10), and has an upper end bonded to the end of the damper base (52) extending in the inboard direction; and each reinforcement portion (60, 70) includes a closed cross section portion (62, 72) extending at an angle and having a lower end joined to the front side frame (10) and an upper end joined to the front upper member (12), and a plate portion (64,74) extending from the closed cross section portion and closing a triangular opening defined by the closed cross section portion (62, 72), the damper housing main body (58) and the damper base (52), the plate portion (64,74) being bonded to the damper housing main body (58) and the damper base (52).

According to this arrangement, because the damper housing main body (58) is connected to the front upper member (12) via the damper base (52) and the reinforcement portion (60, 70), the force that tends to tilt the damper housing structure (50) in the inboard direction can be effectively supported by the closed cross sections of the damper housing main body (58) and the reinforcement portion (60, 70).

In this invention, it may also be arranged such that the damper housing main body (58) is formed by trimming a metallic extruded member into a prescribed shape.

According to this arrangement, the damper housing main body (58) having a closed cross section can be manufactured both economically and efficiently without requiring numerous stamp forming dies, as compared to forming the closed cross section by welding a plurality of stamp formed components together.

In this invention, it may also be arranged such that the reinforcement portion (60, 70) is formed by trimming a metallic extruded member into a prescribed shape.

According to this arrangement, the reinforcement portion (60, 70) provided with a closed cross section portion (62, 72) can be manufactured both economically and efficiently without requiring numerous stamp forming dies, as compared to forming the closed cross section by welding a plurality of stamp formed components together.

In this invention, it may also be arranged such that the damper base (52) is bonded to the damper housing main body (58) with a certain overlap.

According to this arrangement, because the damper base (52) and the damper housing main body (58) can be bonded more securely than by abutting the two components together so that the mechanical strength of the damper housing main body (58) in supporting the damper base (52) can be improved.

In this invention, it may also be arranged such that the damper base (52) overlaps with the reinforcement portion (60, 70) and is bonded thereto, and is provided with a bonding extension (56) that overlaps with an upper surface (12) of the front upper member (12) and is bonded thereto.

According to this arrangement, because the bonding between the damper base (52) and the reinforcement portion (60, 70) and the bonding between the damper base (52) and the front upper member (12) can be accomplished more firmly than by abutting the relevant components together so that the mechanical strength of the reinforcement portion (60, 70) and the front upper member (12) in supporting the damper base (52) can be improved.

In this invention, it may also be arranged such that the damper housing main body (58) is bonded to the reinforcement portion (60, 70) with a certain overlap.

According to this arrangement, the bonding between the reinforcement portion (60, 70) and the damper housing main body (58) can be accomplished more firmly than by abutting the relevant components together so that the mechanical strength of the reinforcement portion (60, 70) damper housing main body (58) can be effectively increased.

In this invention, it may also be arranged such that the front side frame (10) is provided with a projection (48) for mounting a bracket (47) for supporting an arm of a front suspension system in an upper part thereof, the projection (48) having a slanted surface (48C) facing the inboard direction, and the damper housing main body (58) is provided with a lower end bonded to the slanted surface (48C) in the outboard direction.

According to this arrangement, the damper housing main body (58) and the front side frame (10) are bonded to each other such that the slanted surface (48C) of the projection (48) serves as a retaining wall for supporting the lateral force directed in the outboard direction. Thereby, the mechanical strength in supporting the lateral force acting on the damper housing structure (50) in the outboard direction can be favorably supported with a high mechanical strength.

Effect of the Invention

According to the vehicle body front structure of the present invention, because the damper housing main body is provided with a closed cross section, and the reinforcement portions are also provided with a closed cross section, a high reinforcing effect can be achieved. Thereby, without increasing the thickness of the material of the damper housing structure, an adequate mechanical strength of the damper housing structure in supporting the damper can be ensured. Therefore, the weight of the damper housing structure is not required to be increased. Furthermore, the need for a high pressure loading for the stamp forming process can be avoided so that the need for an expensive stamp forming machine and/or a more expensive stamp forming die can be eliminated, and the cost of the manufacturing facilities can be minimized.

DESCRIPTION OF THE PREFERRED EMBODIMENT(S)

A vehicle body incorporated with a structure embodying the present invention is described in the following with reference to the appended drawings. The vehicle body 1 is applied to a four-wheeled vehicle. In the following description, the forward direction coincides with the forward traveling direction of the vehicle body, and the left and right, and the up and down are defined with respect to the vehicle body directed in the forward direction.

The various components that are used for forming the vehicle body (such as a front side frames which will be described hereinafter) and are going to be discussed in the following consist of stamp formed (from roll formed stock) members, extruded members and cast members made of metallic materials such as steel and aluminum alloy unless otherwise specified. Each component may also be formed by joining stamp formed members, extruded members and cast members together. When a component is made of a member having a closed cross section (with respect to a cross section perpendicular to the lengthwise direction), the component may consist of a tubular or pipe member, a stamp formed member given with a closed section by bonding together a plurality of pieces or an extruded member given with a closed cross section at the time of the extrusion process. The work defined by the term "bond" or "join" as used herein may be performed by any per se known bonding means including, not exclusively, welding such as spot welding, arc welding (TIG and MIG welding) and laser welding, fastening such as threaded bolts and SPR (self-piercing riveting), friction stir welding, and bonding agents.

Figure 1:
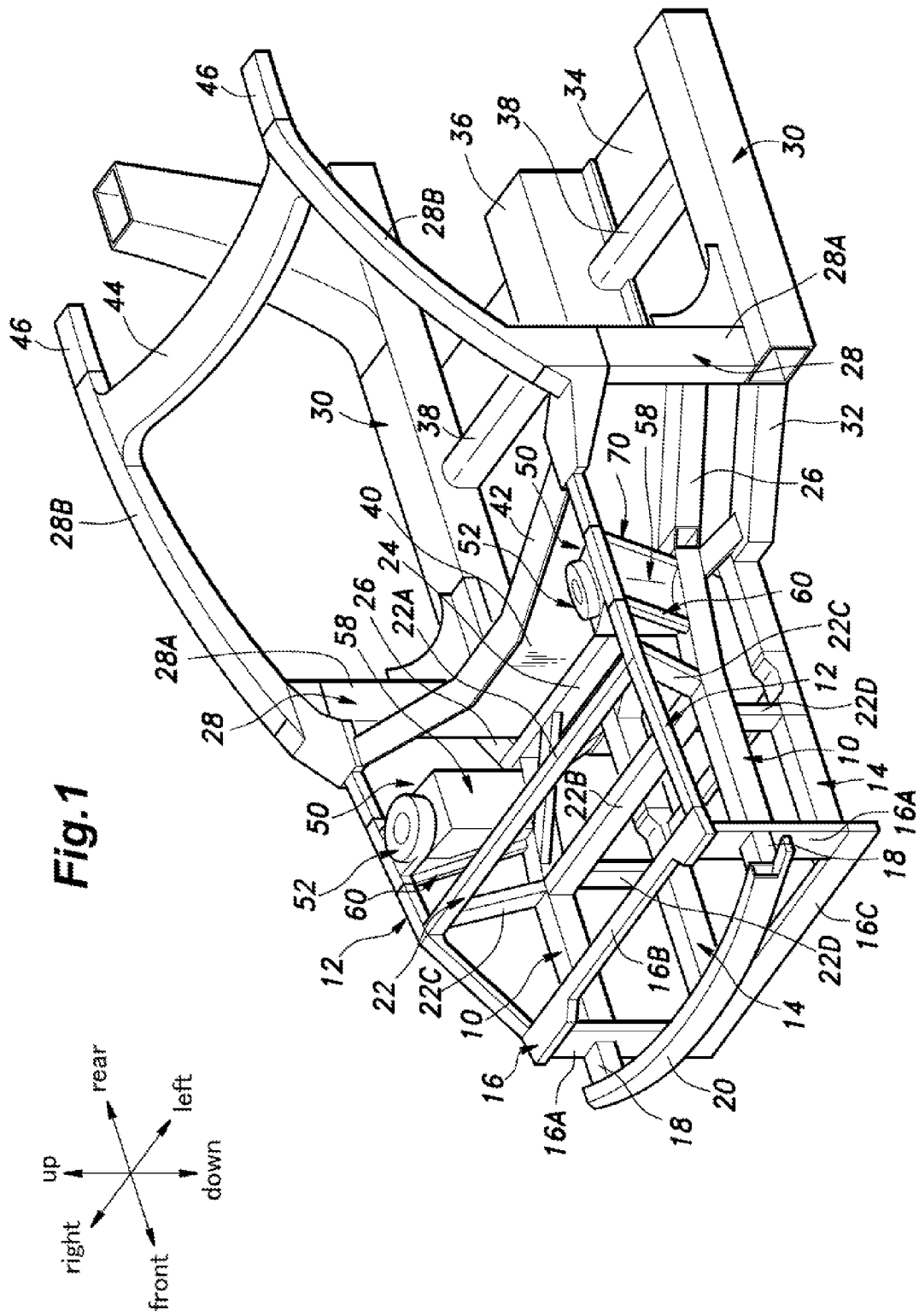
FIG. 1 is a perspective view of a front structure of a vehicle body embodying the present invention.
Figure 2:
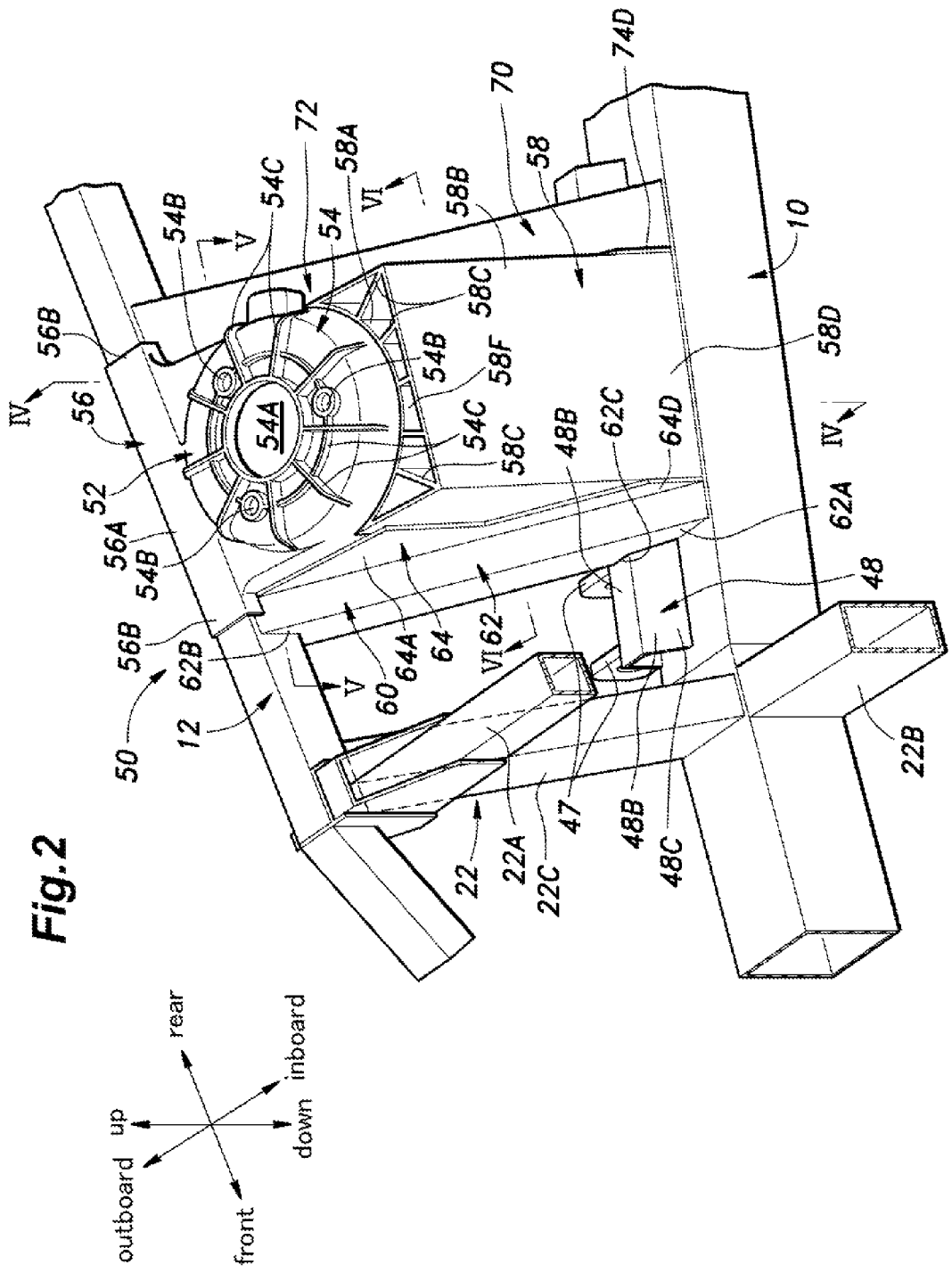
FIG. 2 is an enlarged perspective view of a part of the front structure of the vehicle body.

First of all, the outline of the front structure of the vehicle body of the present embodiment is described in the following with reference to FIG. 1. The front part of the vehicle body includes a pair of front side frames (front side members) 10 extending substantially horizontally in the fore and aft direction on either side of the vehicle body, a pair of front upper members 12 extending in the fore and aft direction on either side of the vehicle body, and a pair of front under frame (front under members) 14 extending substantially horizontally in the fore and aft direction on either side of the vehicle body. Each front upper member 12 is located above and laterally outward (outboard) of the corresponding front side frame 10, and each front under frame 14 is located below and laterally inward (inboard) of the corresponding front side frame 10. The front side frames 10, the front upper members 12 and the front under frame 14 are each formed by joining extruded members having a rectangular closed cross section (with respect to a cross section perpendicular to the lengthwise direction).

A front bulkhead 16 is provided in a front part of the front side frames 10. The front bulkhead 16 includes a pair of bulkhead side members 16A extending substantially vertically on either side, a bulkhead upper member 16B extending substantially horizontally in a lateral direction and connected to the upper end portion of the bulkhead side member 16A at either lateral end thereof, and a bulkhead lower member 16C extending substantially horizontally in the lateral direction and connected to the lower end portion of the bulkhead side member 16A at either lateral end thereof, so that a rectangular frame is defined.

The front end portion of each front side frame 10 is connected to a vertically (lengthwise) middle point of the corresponding bulkhead side member 16A. The front end portion of each front upper member 12 is connected to the corresponding lateral end of the bulkhead upper member 16B. The front end portion of each front under frame 14 is connected to a part of the bulkhead lower member 16C inwardly offset from the lateral end portion thereof on the corresponding side. The front bulkhead 16 is mounted such that an opening defined by the rectangular frame is directed in the fore and aft direction.

A vertically middle point of each bulkhead side member 16A is connected to the rear end of a bumper stay 18 extending forward from the bulkhead side member 16A of the corresponding side. The front end portion of each bumper stay 18 is connected to a part of a bumper beam 20 extending substantially horizontally in the lateral direction adjacent to a corresponding lateral end of the bumper beam 20.

On each side of the vehicle body, the part of the front side frame 10 adjoining the rear end thereof is connected to the part of the front upper member 12 adjoining the rear end thereof via a damper housing structure 50. The damper housing structure 50 is described in greater detail hereinafter.

In a position which is ahead of the damper housing structures 50 on either side and behind the front bulkhead 16 is provided a front frame structure 22 which includes a front upper cross member 22A extending substantially horizontally in the lateral direction between the front upper members 12, a front lower cross member 22B extending substantially horizontally in the lateral direction between the front side frames 10, and a pair of upper side members 22C each joining the front side frame 10 to the front upper member 12 on the corresponding side of the vehicle body, thereby forming a rectangular frame that defines an opening facing the fore and aft direction. On each side of the vehicle body, a lower side member 22D provided between the front side frame 10 and the front under frame 14 joins the front side frame 10 and the front under frame 14 to each other at the position corresponding to the front lower cross member 22B with respect to the fore and aft direction.

The rear end of each front side frame 10 is bonded to the corresponding lateral end of a dashboard cross member 24 which extends substantially horizontally in the lateral direction. The lateral ends of the dashboard cross member 24 are connected to the right and left front pillars 28 (a vertically middle point of a front pillar lower 28A which will be described hereinafter), respectively, via corresponding dash side members 26 extending rearward from the corresponding dashboard cross members 24.

The front pillars 28 are members that define the lateral ends of the passenger compartment in the front part thereof, and each include a vertically extending front pillar lower 28A, and a front pillar upper 28B having a lower end joined to the upper end of the front pillar lower 28A and extending from the upper end of the front pillar lower 28A upward and rearward in an oblique direction.

The lower end of each front pillar lower 28A is joined to the front end of a corresponding one of a pair of side sills 30 extending substantially horizontally in the fore and aft direction along the lower side part of the vehicle body 1 on either side. The front end of each side sill 30 is connected to the rear end of the corresponding front under frame 14 via a corresponding one of a pair of floor side members 32 extending rearward from the front under frame 14.

A floor panel 34 extends between the two side sills 30 on either side. A laterally middle part of the floor panel 34 between the two side sills 30 is provided with a tunnel frame 36 extending in the fore and aft direction. A front floor cross member 38 extends laterally and horizontally between each side sill 39 and the opposing side of an intermediate point of the tunnel frame 36 with respect to the fore and aft direction.

A plate-shaped dashboard lower panel 40 extends between the front pillar lowers 28A. The dashboard lower panel 40 is positioned with the major plane thereof facing substantially in the fore and aft direction, and has an upper edge bonded to a dashboard upper member 42 which will be described hereinafter, a lower edge bonded to the front edge of the floor panel 34, and a pair of side edges bonded to the respective front pillar lowers 28A. The rear ends of the front side frames 10 and the dashboard side members 26 are bonded to the front surface of the dashboard lower panel 40. The front end of the tunnel frame 36 is bonded to the rear surface of the dashboard lower panel 40.

The lower ends of the two front pillar uppers 28B are connected to each other by a dashboard upper member 42 extending laterally. The upper ends of the two front pillar uppers 28B are connected to each other by a front roof rail 44 extending substantially horizontally in the lateral direction. The upper ends of the two front pillar uppers 28B are also connected to the front ends of a pair of front roof side rails 46 extending substantially horizontally in the fore and aft direction, respectively.

The damper housing structure 50 is now described in the following with reference to FIGS. 2 to 6. As the two damper housing structures 50 on either side are symmetric to each other, only the right damper housing structure 50 is described in the following.

As a part of the structure for mounting the damper housing structure 50, a projection 48 extending in the fore and aft direction by a prescribed length is provided on the upper surface of the front side frame 10 in a part thereof on which the damper housing structure 50 is positioned as an extension of the front side frame 10 for mounting a bracket 47 formed as a yoke for supporting a suspension arm of the front wheel suspension system not shown in the drawings. The projection 48 is provided with a vertical surface 48A facing the outboard direction and extending in continuation to the outboard surface of the front side frame 10, a substantially horizontal upper surface 48B and a slanted surface 48C facing the inboard direction so that a hollow trapezoidal cross section is defined.

As shown in FIGS. 2 to 5, the damper base 52 is made of cast light metal such as aluminum, and is integrally formed with a circular dish portion 54 and a bonding extension 56 extending from the circular dish portion 54 in the outboard direction.

The bonding extension 56 is used for bonding the damper base 52 to the front upper member 12, and includes a plate shaped portion 56A overlapping with the upper surface of the front upper member 12, and a hooked cross section portion 56B extending from the front and rear ends of the plate shaped portion 56A in the fore and aft direction in a continuous manner so as to overlap with the upper surface and the inboard surface of the corresponding part of the front upper member 12, and these overlapping portions are bonded to the front upper member 12.

Figure 3:
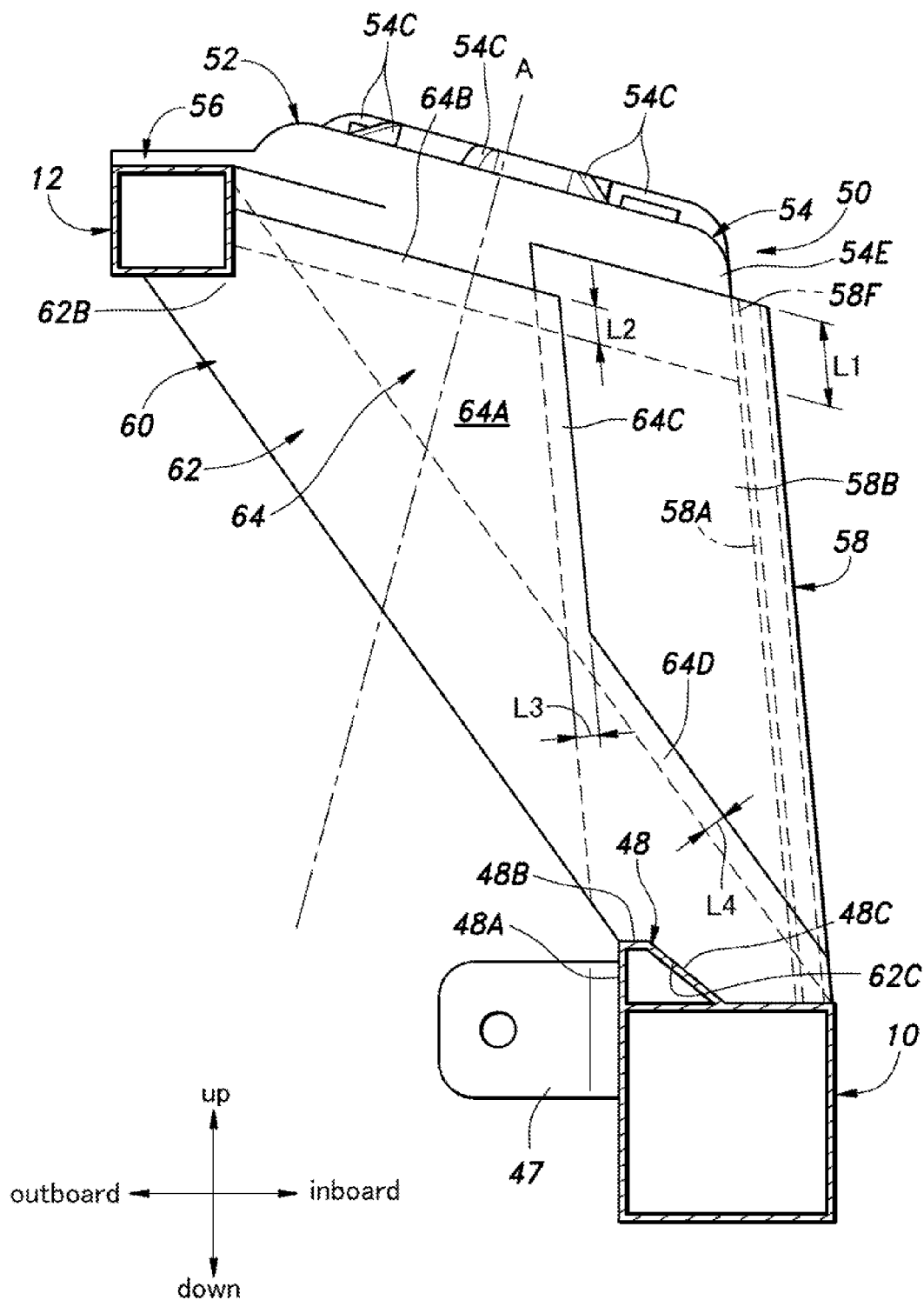
FIG. 3 is a front view of a part of the front structure of the vehicle body.
Figure 4:
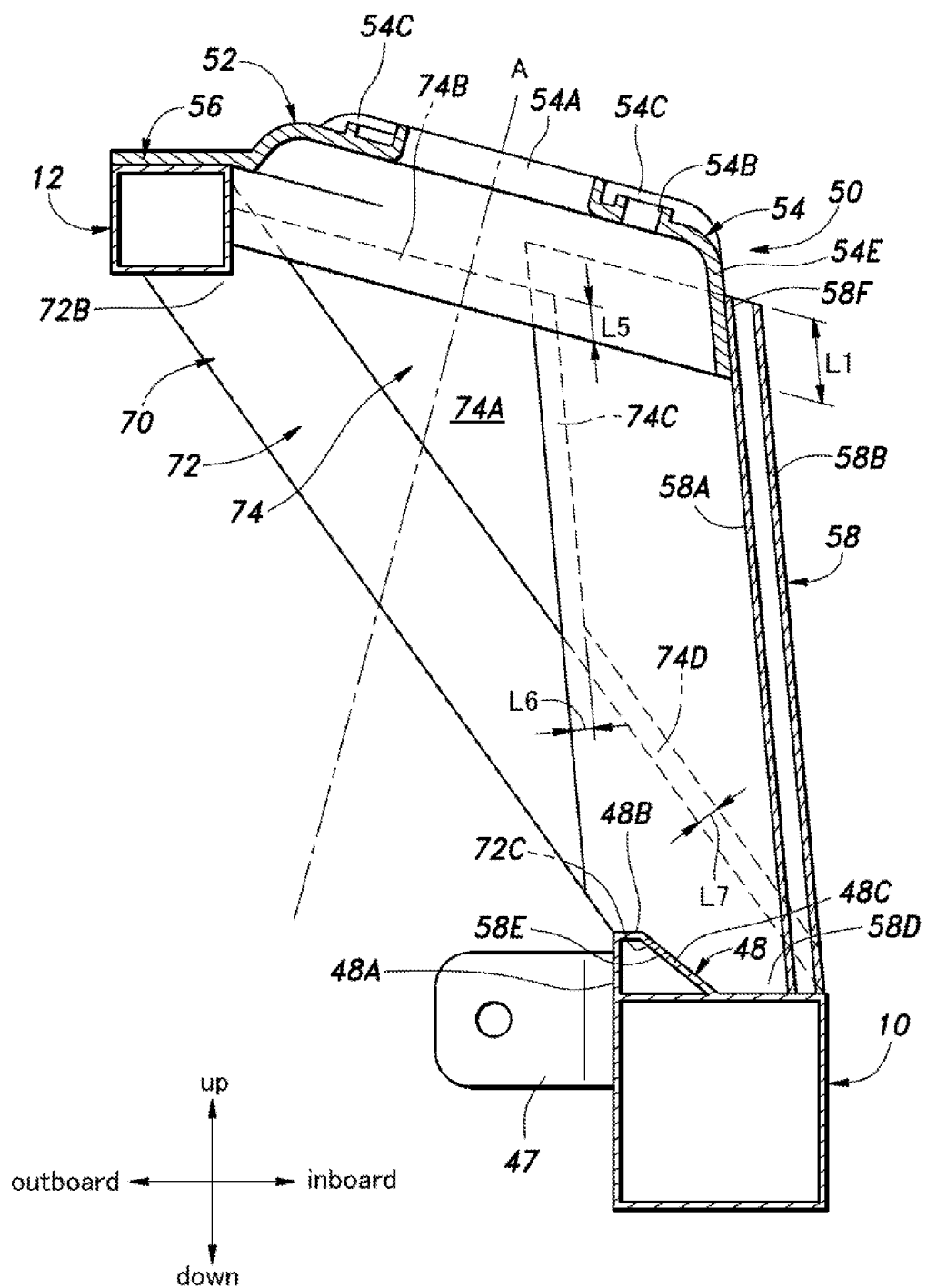
FIG. 4 is an enlarged vertical sectional view of a part of the front structure of the vehicle body (taken along line IV-IV of FIG. 2)
Figure 5:
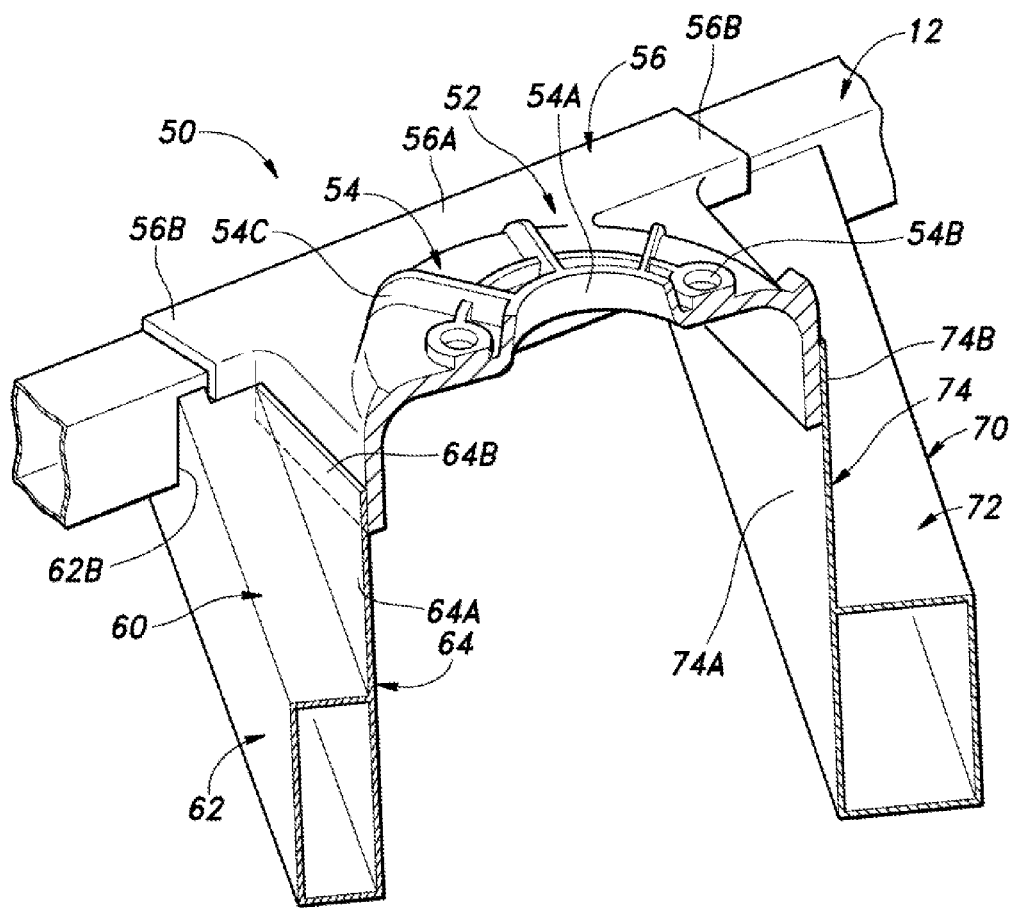
FIG. 5 is an enlarged perspective view partly in section of a part of the front structure of the vehicle body (taken along line V-V of FIG. 2)
Figure 6:
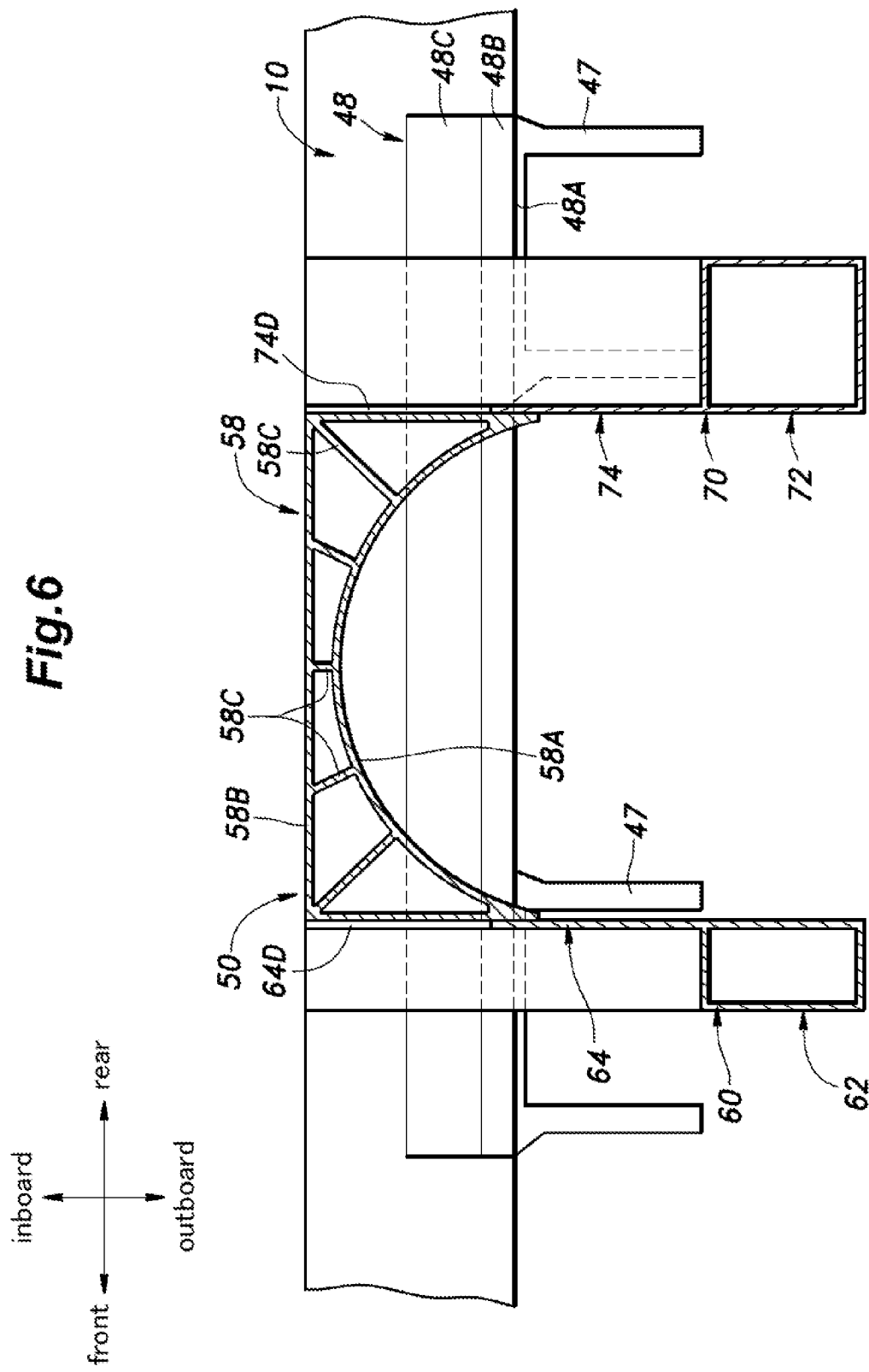
FIG. 6 is a horizontal sectional view of a part of the front structure of the vehicle body (taken along line VI-VI of FIG. 2)

The circular dish portion 54 is provided with a central opening 54A and three through holes 54B arranged around the opening 54A for passing threaded bolts for fastening an upper spring retainer (not shown in the drawings) for the front suspension system to the damper base 52, and reinforcement ribs 54C are integrally cast on the upper surface thereof in the manner of a spider web. The circular dish portion 54 extends from a position corresponding to the front upper member 12 to a position located above the front side frame 10 such that an outer peripheral part 54E including the corresponding semi-cylindrical part overhangs above the front side frame 10. The circular dish portion 54 slants downward as it extends from the part thereof corresponding to the front upper member 12 in the inboard direction. The slanting angle of the circular dish portion 54 is dictated by the slanting angle of the damper (strut bar) (which is mounted to the underside of the circular dish portion 54) of the front wheel suspension system not shown in the drawings. In FIGS. 3 and 4, the imaginary line A indicates the central axial line of the damper.

As shown in FIGS. 2 to 6, the damper housing main body 58 is provided with a closed cross section by combining an arcuate wall 58A having an arcuate shape with a convex surface facing the outboard direction and a rectangular C-shaped wall 58B so as to accommodate the damper (not shown in the drawings) having a cylindrical shape with a minimum space requirement. The arcuate wall 58A is provided with a semi-cylindrical shape having a substantially same radius of curvature as the overhanging part of the circular dish portion 54. Inside the closed cross section of the damper housing main body 58 are a plurality of plate shaped internal ribs 58C that extend between the arcuate wall 58A and the rectangular C-shaped wall 58B.

The damper housing main body 58 extends substantially vertically from the upper surface of the front side frame 10 between the front side frame 10 and the circular dish portion 54 with the lower end 58D thereof bonded to the upper surface of the front side frame 10 and the upper end 58F thereof to the circular dish portion 54 of the damper base 52. Thus, the damper housing main body 58 is provided with a constant cross section over the entire length thereof, and extends linearly between the front side frame 10 and the damper base 52.

The lower end 58D of the damper housing main body 58 is joined to the front side frame 10 by MIG fillet welding with the lower end surface of the damper housing main body 58 abutting the upper surface of the front side frame 10. As shown in FIG. 3, the lower end 58D of the damper housing main body 58 is provided with a cutout 58E conforming to the cross sectional shape of the projection 48 on the front side frame 10. With the lower end surface defined by the cutout 58E abutting the upper surface 48B and the slanted surface 48C of the projection 48, the lower end 58D of the damper housing main body 58 is joined to the upper surface 48B and the slanted surface 48C of the projection 49 by MIG fillet welding. As the slanted surface 48C of the projection faces the inboard direction, the lower end surface of the cutout 58E facing the slanted surface 48C faces the outboard direction.

As shown in FIG. 3, the upper end of the arcuate wall 58A overlaps the semi-cylindrical portion of the outer peripheral part 54E of the circular dish portion 54 from the inboard side by a length L1, and the arcuate wall 58A is joined to the outer peripheral part 54E of the circular dish portion 54 by MIG fillet welding over the entire circumference of the overlapping portion.

The damper housing main body 58 formed by the arcuate wall 58A, the rectangular C-shaped wall 58B and the internal ribs 58C extends between the front side frame 10 and the damper base 52 with a constant cross section over the entire length thereof. Therefore, the damper housing main body 58 may be made by trimming an extruded member 100 (See FIG. 7) consisting metallic material such as aluminum into the final shape.

Figure 7:
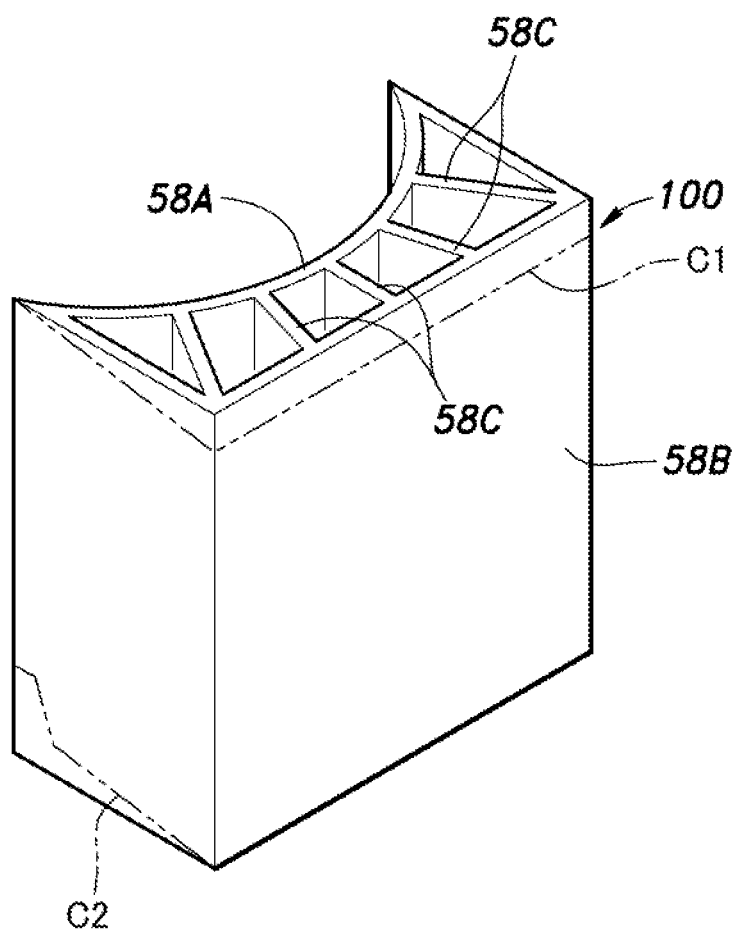
FIG. 7 is a perspective view of an extruded member for the damper housing main body in the front structure of the vehicle body.

FIG. 7 shows the extruded member 100 that may serve as the material of the damper housing main body 58. The extruded member 100 is provided with a closed cross section formed by an arcuate wall 58A and a rectangular C-shaped wall 58B, and a plurality of internal ribs 58C are provided within the closed cross section. The extruded member 100 is formed by the plastic deformation of the material into a member having a constant cross section. By trimming off parts of the upper end and the lower end of the extruded member 100 along the lines C1 and C2, the damper housing main body 58 having the final shape can be prepared.

As shown in FIGS. 2, 3, 5 and 6, a front reinforcement portion 60 is provided on the front part of the damper housing main body 5. The front reinforcement portion 60 is integrally provided with a closed cross section portion 62 having a rectangular cross section and a plate portion 64 projecting from the closed cross section portion 62 in the inboard direction.

The closed cross section portion 62 extends in the inboard direct with some downward slant from the front upper member 12 to the front side frame 10, and has a lower end 62A joined to the upper surface of the front side frame 10 by MIG fillet welding and an upper end 62B formed as a hooked portion joined to the lower surface and the inboard surface of the front upper member 12 by MIG fillet welding.

The lower end 62A of the closed cross section portion 62 is joined to the front side frame 10 by abutting and welding the lower end surface of the closed cross section portion 62 to the upper surface of the front side frame 10 by MIG fillet welding. The lower end 62A of the closed cross section portion 62 is provided with a cutout 62C conforming to the cross sectional shape of the projection 48 on the front side frame 10. Similarly as the cutout 58E of the damper housing main body 58, the cutout 62C is joined to the upper surface 48B and the slanted surface 48C of the projection 48 by MIG fillet welding with the lower end surface of the cutout 62C abutting the upper surface 48B and the slanted surface 48C of the projection 48. As the slanted surface 48C of the projection 48 is a surface facing the inboard direction, the part of the lower end surface of the cutout 62C opposing the slanted surface 48C opposes the slanted surface 48C in the outboard direction, and is welded thereto.

The plate portion 64 is formed as a continuous flat plate, and includes a triangular portion 64A closing a triangular opening defined by the closed cross section portion 62, the damper base 52 and the front wall of the damper housing main body 58, and a welding portion 62D extending between the triangular portion 64A and the lower end 62A of the closed cross section portion 62.

The substantially horizontal upper edge of the triangular portion 64A overlaps with the front part of the peripheral part 54E of the circular dish portion 54 from the front by a prescribed length L2 (See FIG. 3), and thereby defines a bonding portion 64B. The bonding portion 64B joins the front reinforcement portion 60 to the circular dish portion 54 by being MIG fillet welded to the linear (planar) portion of the outer peripheral part 54E on the front end part thereof.

The substantially vertical side edge of the triangular portion 64A overlaps with the front wall of the rectangular C-shaped wall 58B of the damper housing main body 58 from the front by a prescribed distance L3 (See FIG. 3), and thereby defines a bonding portion 64C. The bonding portion 64C joins the front reinforcement portion 60 to the damper housing main body 58 by being MIG fillet welded to the front wall of the rectangular C-shaped wall 58B.

Further, the bonding portion 64D overlaps with the front wall of the rectangular C-shaped wall 58B of the damper housing main body 58 by a prescribed distance L4 (See FIG. 3) from the front, and joins the front reinforcement portion 60 to the damper housing main body 58 by being MIG fillet welded to a front wall part of the C-shaped wall 58B.

The closed cross section portion 62 of the front reinforcement portion 60 extends linearly between the front side frame 10 and the damper base 52 with a substantially same cross section over the entire length thereof, and the plate portion 64 is also provided with a same cross section over the entire length thereof (although the projecting length thereof may vary) so that the front reinforcement portion 60 may be prepared by trimming an extruded member 110 (See FIG. 8) made of metallic material such as aluminum into the final shape.

Figure 8:
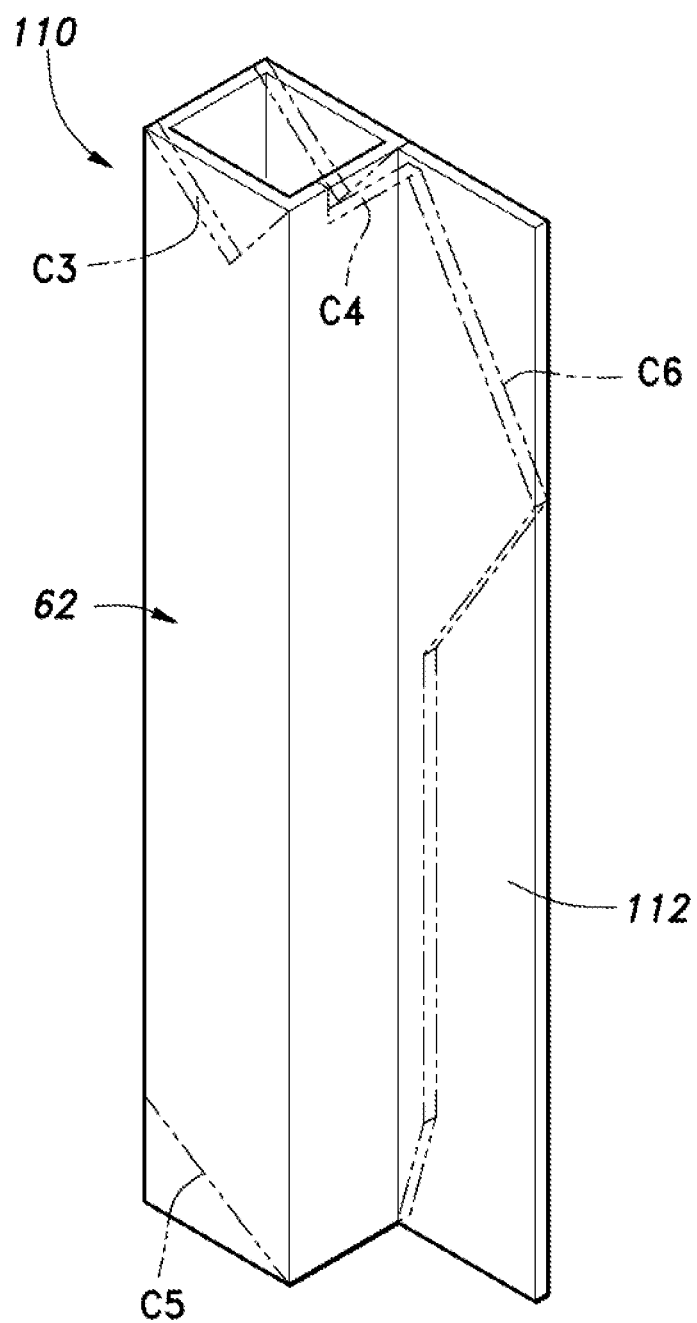
FIG. 8 is a perspective view of an extruded member for a front reinforcement portion of the damper housing structure in the front structure of the vehicle body.

FIG. 8 shows an extruded member 110 that may serve as the material for the front reinforcement portion 60. The extruded member 110 includes a closed cross section portion 62 having a rectangular cross section and a plate portion 112 extending along one of the ridge lines of the closed cross section portion 62 and projecting outwardly from the closed cross section portion 62 linearly aligning with one of the walls 63 of the closed cross section portion 62, and is formed by the plastic deformation of the material into a member having a constant cross section. By trimming off parts of the upper end and the lower end of the extruded member 110 along the lines C3, C4 and C5 and a part of the projecting end of the plate portion 112 along the line C6, the front reinforcement portion 60 having the final shape can be prepared.

As shown in FIGS. 2, and 4 to 6, the rear reinforcement portion 70 is provided on the rear part of the damper housing main body 58. The rear reinforcement portion 70 includes a closed cross section portion 72 having a rectangular cross section and a plate portion 74 extending along the inboard and front edge of the closed cross section portion 72, and projecting further in the inboard direction than the closed cross section portion 72. The rear reinforcement portion 70 is similar to the front reinforcement portion 60 except for that the orientation is inverted in relation to the front reinforcement portion 60, and the cross section of the closed cross section portion 72 of the rear reinforcement portion 70 is different from that of the front reinforcement portion 60.

The closed cross section portion 72 extends in the inboard direction with some downward slant from the front upper member 12 to the front side frame 10, and has a lower end 72A joined to the upper surface of the front side frame 10 by MIG fillet welding and an upper end 72B formed as a hooked portion joined to the lower surface and the inboard surface of the front upper member 12 by MIG fillet welding.

The lower end 72A of the closed cross section portion 72 is joined to the front side frame 10 by abutting and welding the lower end surface of the closed cross section portion 72 to the upper surface of the front side frame 10 by MIG fillet welding. As shown in FIG. 3, the lower end 72A of the closed cross section portion 72 is provided with a cutout 72C conforming to the cross sectional shape of the projection 48 on the front side frame 10. Similarly as the cutout 58E of the damper housing main body 58, the cutout 72C is joined to the upper surface 48B and the slanted surface 48C of the projection 48 by MIG fillet welding with the lower end surface of the cutout 72C abutting the upper surface 48B and the slanted surface 48C of the projection 48. As the slanted surface 48C of the projection is a surface facing the inboard direction, the part of the lower end surface of the cutout 72C opposing the slanted surface 48C opposes the slanted surface 48C in the outboard direction, and is welded thereto.

The plate portion 74 is formed as a continuous flat plate, and includes a triangular portion 74A closing a triangular opening defined by the closed cross section portion 72, the damper base 52 and the front wall of the damper housing main body 58, and a welding portion 72D extending between the triangular portion 74A and the lower end 72A of the closed cross section portion 72.

The substantially horizontal upper edge of the triangular portion 74A overlaps with the front part of the peripheral part 54E of the circular dish portion 54 from the rear by a prescribed length L5 (See FIG. 4), and thereby defines a bonding portion 74B. The bonding portion 74B joins the rear reinforcement portion 70 to the circular dish portion 54 by being MIG fillet welded to the linear (planar) portion of the outer peripheral part 54E on the rear end part thereof.

The substantially vertical side edge of the triangular portion 74A overlaps with the front wall of the rectangular C-shaped wall 58B of the damper housing main body 58 from the rear by a prescribed distance L6 (See FIG. 4), and thereby defines a bonding portion 74C. The bonding portion 74C joins the rear reinforcement portion 70 to the damper housing main body 58 by being MIG fillet welded to the rear wall of the rectangular C-shaped wall 58B.

Further, the bonding portion 74D overlaps with the rear wall of the rectangular C-shaped wall 58B of the damper housing main body 58 by a prescribed distance L7 (See FIG. 4) from the rear, and joins the rear reinforcement portion 70 to the damper housing main body 58 by being MIG fillet welded to a rear wall part of the C-shaped wall 58B.

Figure 9:
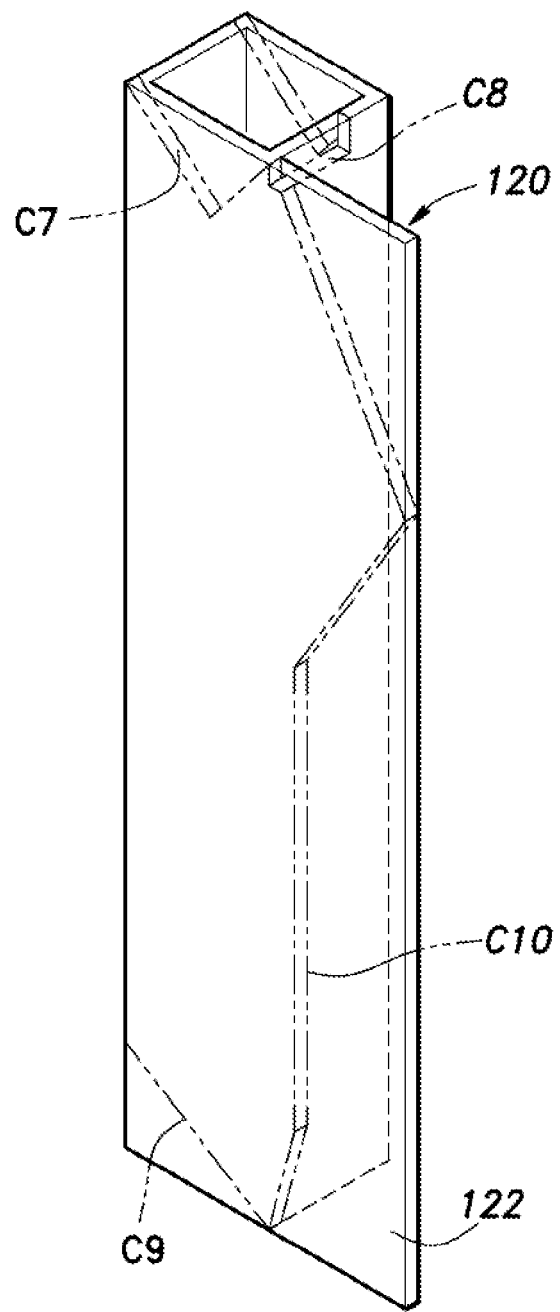
FIG. 9 is a perspective view of an extruded member for a rear reinforcement portion of the damper housing structure in the front structure of the vehicle body.

The closed cross section portion 72 of the rear reinforcement portion 70 extends linearly between the front side frame 10 and the damper base 52 with a substantially same cross section over the entire length thereof, and the plate portion 74 is also provided with a same cross section over the entire length thereof (although the projecting length thereof may vary) so that the rear reinforcement portion 70 may be prepared by trimming an extruded member 120 (See FIG. 9) made of metallic material such as aluminum into the final shape.

FIG. 8 shows an extruded member 120 that may serve as the material for the rear reinforcement portion 70. The extruded member 120 includes a closed cross section portion 72 having a rectangular cross section and a plate portion 122 extending along one of the ridge lines of the closed cross section portion 72 and projecting outwardly from the closed cross section portion 72 linearly aligning with one of the walls 73 of the closed cross section portion 72, and is formed by the plastic deformation of the material into a member having a constant cross section. By trimming off parts of the upper end and the lower end of the extruded member 120 along the lines C7, C8 and C9 and a part of the projecting end of the plate portion 122 along the line C10, the rear reinforcement portion 70 having the final shape can be prepared.

According to the arrangement described above, because the damper housing main body 58 is provided with a closed cross section that gives a higher strength than a comparable open cross section, and both the front reinforcement portion 60 and the rear reinforcement portion 70 are provided with a closed cross section, a particularly effective reinforcement effect can be achieved. Therefore, without requiring the thickness of the material for the damper housing main body 58, the front reinforcement portion 60 and the rear reinforcement portion 70 to be increased, an adequate mechanical strength for supporting the damper with the damper housing structure 50 can be achieved. Therefore, the weight of the damper housing structure 50 is not required to be increased. Furthermore, the need for a high pressure loading for the stamp forming process can be avoided so that the need for an expensive stamp forming machine and/or a more expensive stamp forming die can be eliminated, and the cost of the manufacturing facilities can be minimized.

Because the damper housing main body 58 consisting of the arcuate wall 58A and the rectangular C-shaped wall 58B, and having a closed cross section, along with the front reinforcement portion 60 including the closed cross section portion 62 and the rear reinforcement portion 70 including the closed cross section portion 72, can be formed by trimming metallic extruded members 100, 110 and 120 into prescribed shapes, as compared to the corresponding members formed by joining a plurality of stamp formed components so as to have a closed cross section, the damper housing main body 58, the reinforcement portion 60 and the rear reinforcement portion 70, each provided with a closed cross section, can be manufactured in a more efficient way without requiring numerous stamp forming dies.

Because the damper housing main body 58 extends upward from the upper surface of the front side frame 10, and is joined to the front upper member 12 via the damper base 52, the front reinforcement portion 60 and the rear reinforcement portion 70, the loading that tends to tilt the damper housing structure 50 in the inboard direction can be effectively supported by the damper housing main body 58 provided with a closed cross section defined by the arcuate wall 58A and the rectangular C-shaped wall 58B. This in turn allows the front side frame 10 to be reduced in thickness owing to the reduced dependence on the front side frame 10 in supporting the damper housing structure 50, and reduces the weight of the vehicle body.

Because the damper base 52 is joined to the upper end 58F of the damper housing main body 58 with an overlap of a prescribed length L1, instead of abutting thereto, a high bonding strength can be achieved so that the strength of the damper housing main body 58 in supporting the damper base 52 can be improved. Furthermore, because the damper base 52 is joined to the front reinforcement portion 60 and the rear reinforcement portion 70 with an overlap of a prescribed length L2, L5, instead of abutting thereto, additionally with the bonding extension 56 overlapping the upper surface of the front upper member 12, a high bonding strength can be achieved so that the mechanical strength in supporting the damper base 52 with the front reinforcement portion 60, the rear reinforcement portion 70 and the front upper member 12 can be improved.

Because the damper housing main body 58 is joined to the front reinforcement portion 60 and the rear reinforcement portion 70 each with an overlap of a prescribed length L3, L4, L6 and L7, instead of abutting thereto, a high bonding strength can be achieved so that the damper housing main body 58 can be reinforced effectively by the front reinforcement portion 60 and the rear reinforcement portion 70.

The parts of the lower end surfaces of the cutout 58E of the damper housing main body 58, the cutout 62C of the front reinforcement portion 60, and the cutout 72C of the rear reinforcement portion 70 opposing the slanted surface 48C of the projection 48 are bonded to the slanted surface 48C from the inboard direction so that the slanted surface 48C is enabled to effectively support the lateral force directed in the inboard direction, and the lateral force acting on the damper housing structure 50 in the outboard direction can be favorably supported.

The preferred embodiment of the present invention has been described, but the present invention is not limited by the specific embodiment, but may be modified and varied without departing from the spirit of the present invention.

For instance, the vehicle body to which the damper housing structure 50 is applied is required to be provided with a front side frame 10 and a front upper member 12, and may be applicable to a vehicle body without a front under frame 14 and/or a front frame structure 22.

The damper housing main body 58, the front reinforcement portion 60 and/or the rear reinforcement portion 70 are not required to be made by trimming metallic extruded members to the prescribed shapes, but may also be made by joining stamp formed components.

The various components shown in conjunction with the foregoing embodiment are not necessarily essential to the present invention, but may be substituted and/or omitted without departing from the spirit of the present invention.

The contents of the original Japanese patent application (Japanese patent application No. 2012-278920 filed on Dec. 21, 2012) on which the Paris Convention priority claim is made for the present application are incorporated in this application by reference.

GLOSSARY 10 front side frame
12 front upper member
14 front under frame
16 front bulkhead
20 bumper beam
28 front pillar
30 side sill
47 bracket
48 projection
50 damper housing structure
52 damper base
54 circular dish portion
56 bonding extension
58 damper housing main body
60 front reinforcement portion
62 closed cross section portion
64 plate portion
70 rear enforcement portion 72 closed cross section portion
100 extruded member
110 extruded member
112 plate portion
120 extruded member
122 plate portion

The invention claimed is:

1. A vehicle body front structure, comprising:
 a pair of front side frames extending in the fore and aft direction on either side;
 a pair of front upper members extending in the fore and aft direction on either side above the corresponding front side frames, respectively; and
 a pair of damper housing structures provided on either side to connect the front side frame and the front upper member to each other on either side;
 each damper housing structure comprising
 a damper base joined to the front upper member,
 a damper housing main body extending linearly with a same closed cross section over an entire length thereof, and having a lower end joined to the front side frame and an upper end joined to the damper base, and
 a reinforcement portion provided on each of a front part and a rear part of the damper housing main body, extending linearly with a same closed cross section over an entire length thereof, and having a lower end joined to the front side frame, an upper end joined to the front upper member and a vertically extending side edge joined to the damper housing main body.

2. The vehicle body front structure according to claim 1, wherein the damper housing main body is provided with a closed cross section having an arcuate outboard wall with a concave surface.

3. The vehicle body front structure according to claim 1, wherein:
 the front upper member is located outboard of the front side frame;
 the damper base has an end that is bonded to the front upper member and extends inboard beyond the front upper member;
 the damper housing main body extends vertically from the front side frame, and has an upper end bonded to the end of the damper base extending in the inboard direction; and
 each reinforcement portion includes a closed cross section portion extending at an angle and having a lower end joined to the front side frame and an upper end joined to the front upper member, and a plate portion extending from the closed cross section portion and closing a triangular opening defined by the closed cross section portion, the damper housing main body and the damper base, the plate portion being bonded to the damper housing main body and the damper base.

4. The vehicle body front structure according to claim 1, wherein the damper housing main body is formed by trimming a metallic extruded member into a prescribed shape.

5. The vehicle body front structure according to claim 1, wherein the reinforcement portion is formed by trimming a metallic extruded member into a prescribed shape.

6. The vehicle body front structure according to claim 1, wherein the damper base is bonded to the damper housing main body with a certain overlap.

7. The vehicle body front structure according to claim 1, wherein the damper base overlaps with the reinforcement portion and is bonded thereto, and is provided with a bonding extension that overlaps with an upper surface of the front upper member and is bonded thereto.

8. The vehicle body front structure according to claim 1, wherein the damper housing main body is bonded to the reinforcement portion with a certain overlap.

9. The vehicle body front structure according to claim 1, wherein the front side frame is provided with a projection for mounting a bracket for supporting an arm of a front suspension system in an upper part thereof, the projection having a slanted surface facing the inboard direction, and the damper housing main body is provided with a lower end bonded to the slanted surface in the outboard direction.

\* \* \* \* \*